(12) United States Patent
Huonker et al.

(10) Patent No.: US 10,495,874 B2
(45) Date of Patent: Dec. 3, 2019

(54) SCANNER DEVICE FOR 2-DIMENSIONAL DEFLECTION OF A LASER BEAM

(71) Applicant: TRUMPF LASER GMBH, Schramberg (DE)

(72) Inventors: Martin Huonker, Dietingen (DE); Reiner Bruestle, Lauterbach (DE)

(73) Assignee: TRUMPF LASER GMBH, Schramberg (DE)

( * ) Notice: Subject to any disclaimer, the term of this patent is extended or adjusted under 35 U.S.C. 154(b) by 350 days.

(21) Appl. No.: 14/665,198

(22) Filed: Mar. 23, 2015

(65) Prior Publication Data

US 2015/0212318 A1    Jul. 30, 2015

Related U.S. Application Data

(63) Continuation of application No. PCT/EP2013/067610, filed on Aug. 26, 2013.

(30) Foreign Application Priority Data

Sep. 21, 2012   (DE) ........................ 10 2012 216 979

(51) Int. Cl.
*G02B 26/10* (2006.01)

(52) U.S. Cl.
CPC ................................... *G02B 26/105* (2013.01)

(58) Field of Classification Search
CPC ................ G02B 26/105; G02B 26/101; G02B 26/00–129

(Continued)

(56) References Cited

U.S. PATENT DOCUMENTS 3,029,947 A * 4/1962 Roubal .................... B07B 1/42
                                                         209/326
3,280,612 A * 10/1966 Schmidt ................... B21D 9/03
                                                         72/156

(Continued)

FOREIGN PATENT DOCUMENTS

CN          2916665 Y      6/2007
DE     102006012442 B2     6/2008

(Continued)

OTHER PUBLICATIONS

Edmund Optics tutorial page https://www.edmundoptics.com/resources/application-notes/lasers/understanding-spatial-filters/ printed 2017.*

(Continued)

*Primary Examiner* — George G King
(74) *Attorney, Agent, or Firm* — Fish & Richardson P.C.

(57) ABSTRACT

A scanner device configured for 2-dimensional deflection of a laser beam by mirrors that are each pivotably supported about an axis and that are driven in a motorized manner, includes a first motor-mirror unit that has a first mirror and a drive motor, and a carrier for securing the first motor-mirror unit. The first motor-mirror unit is selected from one of two different possible motor-mirror units, each of which has an assembly flange, an identical abutment face, and can be selectively releasably secured with the abutment faces to the same first assembly face of the carrier. The two different possible motor-mirror units differ from each other with respect to the mirror size and/or mirror position in the carrier.

12 Claims, 3 Drawing Sheets

(58) Field of Classification Search
USPC .......................................... 359/196.1–226.3
See application file for complete search history.

(56) References Cited

U.S. PATENT DOCUMENTS

| | | | |
|---|---|---|---|
| 4,877,955 A | 10/1989 | Ono | |
| 4,974,943 A * | 12/1990 | Noguchi | G02B 27/0031 359/305 |
| 5,713,427 A * | 2/1998 | Lutz | B60K 1/02 180/65.245 |
| 7,339,712 B2 | 3/2008 | Kerekes et al. | |
| 2003/0226264 A1* | 12/2003 | Zemlok | B27B 9/00 30/383 |
| 2007/0146869 A1* | 6/2007 | Lauer | G02B 5/005 359/368 |
| 2010/0134859 A1* | 6/2010 | Hastings | G02B 7/1821 359/200.7 |

FOREIGN PATENT DOCUMENTS

| | | |
|---|---|---|
| EP | 1536267 B1 | 4/2007 |
| JP | 07016768 A | 1/1995 |
| JP | 2005211977 A | 8/2005 |
| WO | WO2009018854 A1 | 2/2009 |

OTHER PUBLICATIONS

Parveen "Understanding Spatial Filters—Physics—Lecture Handout, Exercises for Physics," Allahabad University https://www.docsity.com/en/understanding-spatial-filters-physics-lecture-handout/84005/ Jul. 2012.*

Holography Forum "Spatial Filter Theory" http://dragonseye.com/holography/net54holoarchive/1078363018.htm, Mar. 2004.*

English Translation of Chinese Office Action from corresponding application No. 201380055024.0, dated Jun. 27, 2016, 16 pages.

Notification of Transmittal of Translation of the International Preliminary Report on Patentability and Written Opinion for corresponding PCT Application No. PCT/EP2013/067610, dated Apr. 2, 2015, 6 pages.

International Search Report from corresponding PCT Application No. PCT/EP2013/067610, dated Nov. 4, 2013, 4 pages.

* cited by examiner

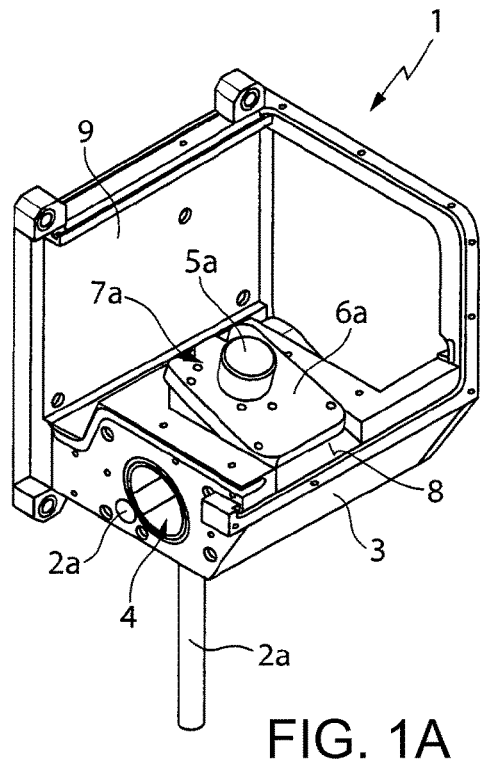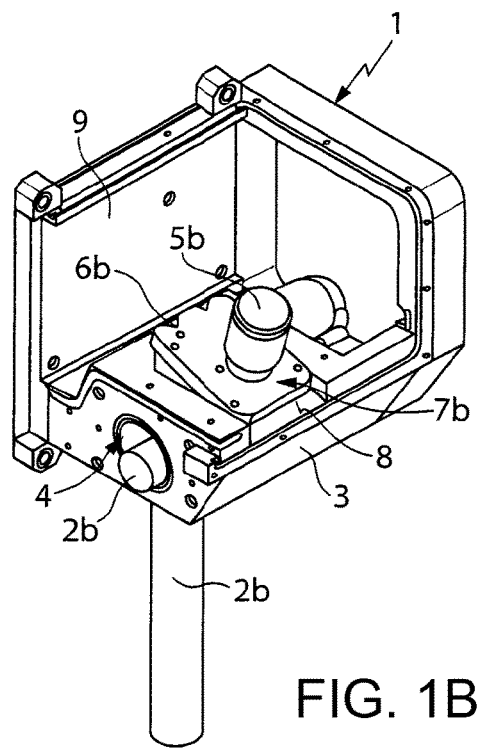
FIG. 1A  FIG. 1B
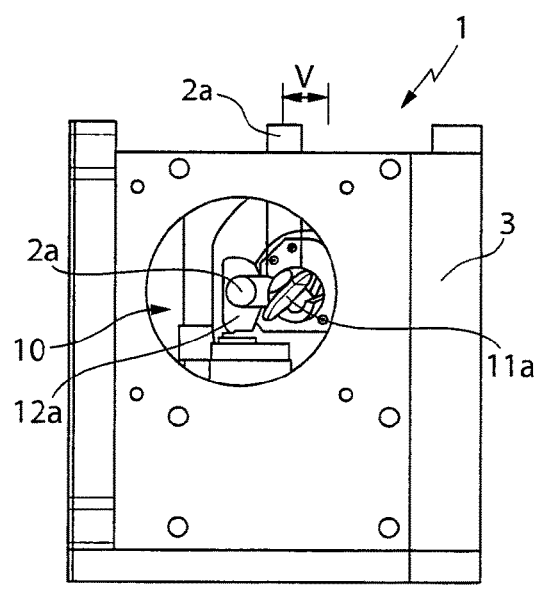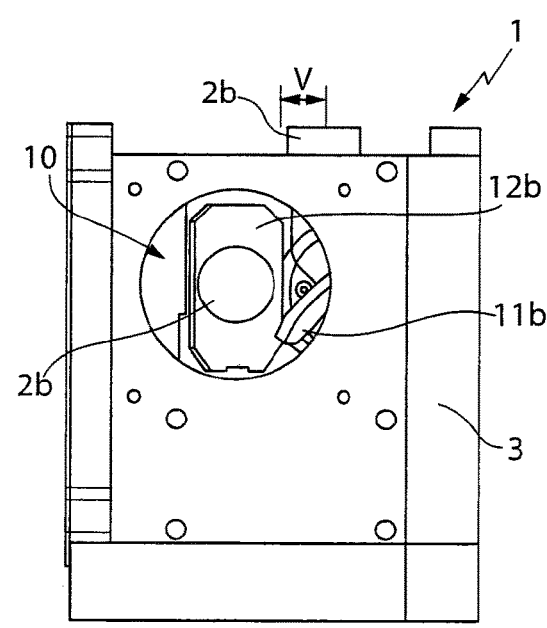
FIG. 2A  FIG. 2B

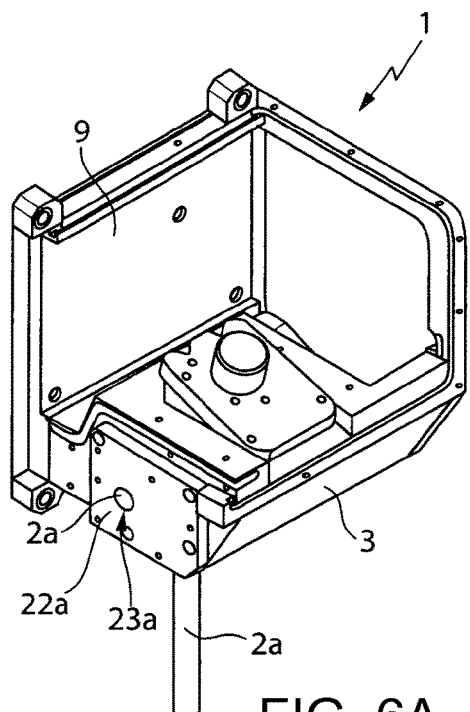
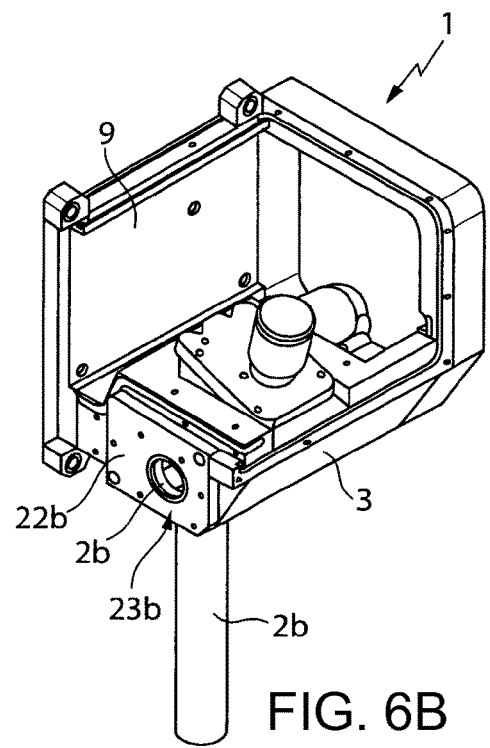
FIG. 6A    FIG. 6B
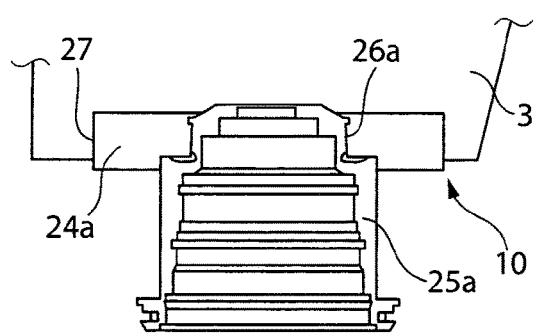
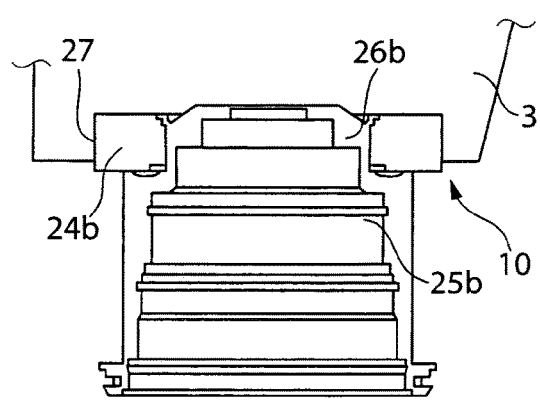
FIG. 7A    FIG. 7B

SCANNER DEVICE FOR 2-DIMENSIONAL DEFLECTION OF A LASER BEAM

CROSS-REFERENCE TO RELATED APPLICATIONS

This application is a continuation of and claims priority under 35 U.S.C. § 120 to PCT Application No. PCT/EP2013/067610 filed on Aug. 26, 2013, which claimed priority to German Application No. DE 10 2012 216 979.2, filed on Sep. 21, 2012. The contents of both of these priority applications are hereby incorporated by reference in their entirety.

TECHNICAL FIELD

The present disclosure relates to 2-dimensional deflection of a laser beam.

BACKGROUND

For targeted manipulation of a laser beam, scanner devices typically have two mirrors by which the incident laser beam is deflected and manipulated first by pivoting the first mirror about a first axis and subsequently by pivoting the other second mirror about a second axis. To pivot the mirrors, there is provided in each case a drive motor which, together with the mirror, forms a motor-mirror unit. The laser beams influenced by the scanner device are typically collimated before entering the scanner device and, after leaving the scanner device, are focused by a scanner objective lens (for example, an F-theta objective lens) that is arranged on the scanner device.

Industrial laser material processing typically nowadays requires not only precise orientation or deflection of a laser beam that remains consistent in terms of structure and intensity. Instead, a large number of different laser types that vary in terms of their beam parameters are used. There are produced, by a combination of different collimation and objective focal lengths, a large number of imaging relationships that lead to different beam diameters. To comply with the differing requirements on the beam diameters, different scanner devices are commercially available and are each adapted structurally to the corresponding laser beam diameters (apertures).

If laser beams with small diameters are intended to be deflected, correspondingly small mirrors are used and the mirror axes thereof are arranged with small spacing with respect to each other. In order to deflect laser beams with larger diameters, comparatively large mirrors have to be used and the mirror axes thereof have to be arranged further apart from each other so that the large mirrors do not collide during pivoting. As a result of this change of the beam paths or the beam geometries (i.e., as a result of the arrangement of mirrors of different sizes with different spacings from each other), it is possible to make use of the advantage of improved dynamics of the small deflection mirrors. These mirrors are particularly suitable for particularly rapid and precise manipulation since they are less inert compared to larger mirrors and consequently can be pivoted and positioned more rapidly and more precisely about the axes thereof. The above-described relative spatial beam displacement and the different arrangement of different mirrors require structural adaptation of the scanner device.

To this end, known scanner devices are commercially available in which for each laser beam diameter an aperture-specific mounting plate is introduced and mounted. Motor-mirror units are directly secured to these different mounting plates typically before the mounting plate is introduced into the scanner device, depending on the desired laser beam diameter. The respective mounting plates are geometrically formed in such a manner that, together with the secured motor-mirror units, there is produced the desired spatial arrangement of the mirrors or the mirror axes which is required for the deflection of the laser beam with the corresponding laser beam diameter. For each laser beam diameter, another mounting plate is consequently necessary. The known mounting plates are, however, components that are comparatively heavy and that can be produced only with a relatively high level of complexity (for example, by means of a casting method and precision milling). They must further, in addition to the different motor-mirror units, be kept in a state of readiness which involves additional complexity. The known replacement of both the mounting plates and the motor-mirror units is consequently an expensive and complex system both with respect to the required components and with respect to the handling.

SUMMARY

The present disclosure relates to a scanner device for 2-dimensional deflection of a laser beam in which the scanner device includes two mirrors that are each pivotably supported about an axis and that are driven in a motorized manner. The scanner device can include a first motor-mirror unit, which has the first mirror together with the drive motor, and a carrier for securing the first motor-mirror unit. The present disclosure further relates to a set of motor-mirror units for the scanner device. The scanner device is intended to overcome or at least reduce the disadvantages set forth above.

The scanner device can be characterized by at least two first motor-mirror units that each have an assembly flange, that each have identical abutment faces, and that differ from each other with respect to the mirror size and/or mirror position. The at least two first motor-mirror units can be selectively releasably secured with the abutment faces to the same first assembly face of the carrier. Due to the selective securing of different first motor-mirror units by an assembly flange, the scanner device can advantageously deflect using one and the same (universal) carrier laser beams with different beam diameters since the different spatial positions of the mirror axes, the different mirror positions, or the different mirror sizes are adapted to the beam geometry changed by the differing beam diameters. For example, the first motor-mirror unit produces, together with the assembly flange thereof, a spatial orientation of the axis of the first mirror that is suitable for deflecting a laser beam with a small beam diameter, whereas another first motor-mirror unit, together with the assembly flange thereof, produces a different spatial orientation of the axis of the first mirror, in which the different orientation is suitable for deflecting a laser beam with another larger beam diameter.

According to an aspect of the disclosure, only a single carrier (universal carrier) is required for all the different beam diameters, such that multiple aperture-specific mounting plates do not have to be changed. Accordingly, the carrier can be structurally integrated in the (universal) scanner device, resulting in cost-savings during the production of the scanner device and reduced when handling the carrier or the scanner device. The scanner device forms a modular (universal) system or a modular arrangement that is adapted to the redirection of laser beams with different beam diameters. The carrier is adapted with respect to its size, geometric shape or structure to the requirements of the smallest to the largest beam diameter to be covered by the scanner device.

The axis of a first motor-mirror unit is positioned together with a first assembly flange thereof in a first spatial position relative to the abutment face of this first assembly flange. The first spatial position differs from a second spatial position, which the axis of another first motor-mirror unit takes up together with a second assembly flange thereof relative to the abutment face of the second assembly flange. Since these assembly flanges each have identical abutment faces, however, the spatial positions of the respective axes or the respective spatial mirror positions differ from each other. The assembly flanges can further be releasably secured to the assembly face of the carrier by the abutment faces, the abutment faces being formed on the assembly flanges. The assembly flanges act as adapters between the mirrors together with the drive motors, on the one hand, and the carrier, on the other hand. In scanner devices having two mirrors, the mirror axes about which the mirrors are each pivotably supported are generally arranged in a skewed manner with respect to each other. It is possible to provide not only two different assembly flanges but also three or more different assembly flanges of the motor-mirror units, depending on how many different beam diameters are intended to be selectively deflected by the one scanner device.

In some implementations, a second motor-mirror unit, which has the other second mirror together with the drive motor, includes, for securing to the carrier, an assembly flange. The assembly flange can be releasably secured with an abutment face to a second assembly face of the carrier. At least two second motor-mirror units can each have an assembly flange and identical abutment faces. The at least two second motor-mirror units can also differ with respect to the mirror size and/or mirror position, and can be selectively releasably secured to the same second assembly face of the carrier. Consequently, it is possible to secure second motor-mirror units selectively with one or another assembly flange to the carrier, such that more configurations for producing different beam geometries (or beam paths or beam displacements) for different beam diameters in the scanner device are possible. It is then possible to arrange the first mirror of the scanner device by selectively securing different first mirror/motor assembly flange combinations (motor-mirror units) in a variable manner in terms of their spatial orientation, but also to arrange the second mirror by selectively securing the second motor-mirror units.

In some implementations, the carrier includes a wall having a receiving opening for at least partially engaging the motor-mirror units in the carrier. The receiving openings at least partially surround the motor-mirror units in the position secured to the carrier and consequently protect them. The receiving openings further facilitate the positioning or introduction of the motor-mirror units in the receiving openings and, when the carrier is constructed as a carrier with an inner space, afford simple access to this inner space for the assembly operation of the motor-mirror units.

In some implementations, the contour path of the receiving opening is adapted to the different mirror sizes and/or different mirror positions of multiple motor-mirror units that can be selectively arranged. The contour path of the receiving openings (or the opening cross-section of the receiving openings) is therefore advantageously adapted to the displacement of different mirror axes or mirror positions, in which the displacement is produced by the selective securing of the different motor-mirror units with different assembly flanges to the carrier. The size of the receiving openings in this instance corresponds at least to the radial extent (e.g., at least the outer motor diameters) of the engaged or assembled motor-mirror unit that is configured to deflect the laser beam with the largest beam diameter.

In some implementations, the carrier includes, for the input laser beam, an inlet opening whose opening cross-section is adapted to the different mirror sizes and/or different mirror positions of multiple motor-mirror units that can be selectively arranged. Thus, it is possible to deflect laser beams with different diameters without the beams striking the carrier (or a wall of the carrier) and to prevent further propagation inside the scanner device. Furthermore, the inlet opening is limited only to the regions of the carrier through which the different laser beams are introduced due to the different beam geometries for different beam diameters. The adaptation of the inlet opening cross-section to the different mirror sizes and/or mirror positions (or to the different relative spatial positions of the mirror axes) may, for example, be achieved by the inlet opening cross-section at least approximately corresponding to a cross-section of the envelopes of all the laser beams that are selectively introduced with different beam diameters. The inlet opening is, for example, formed in a carrier wall of the carrier.

In some implementations, the receiving opening and/or the inlet opening are each constructed as an elongate hole. An elongate hole constitutes an inlet or receiving opening that is particularly simple to produce and that can enable reduced production costs for the carrier and the scanner device.

In some implementations, the carrier, including the inlet opening, can be at least partially covered with different perforated plates whose hole openings differ in terms of diameter and/or in terms of the relative position. Since the perforated plates have hole opening diameters and hole opening positions adapted to the corresponding laser beam diameters, the laser beam inlet into the scanner device or into the carrier can advantageously be constructed in a relatively tight manner. The free connection between an outer region of the scanner device and an inner region (an inner space) of the scanner device is then, when the perforated plate is fitted to the carrier, limited only to the diameter of the respective hole opening. Dust or other particles cannot be introduced into the inner region in uncontrolled quantities (e.g., during the laser operation). The different perforated plates can be releasably secured to the carrier, such as a carrier wall.

The carrier can further form, at least partially, a housing of the scanner device. Since the carrier does not have to be changed for every different laser beam diameter, it can advantageously be constructed as a portion of the scanner device housing. The securing and assembly devices that would otherwise be required to fix the carrier in the scanner device housing can then be dispensed with.

In some implementations, different retention devices can be secured to the carrier, in which the retention devices position a scanner objective lens with a different spacing with respect to the carrier, e.g., with respect to a mirror of the scanner device. Since the different retention devices can be replaced, the distance between the scanner objective lens and the scanner device can be varied or adjusted (for example, the depth at which the scanner objective lens is screwed into the scanner device, such as into the carrier, can be varied). This advantageously enables the largest possible scanning field to be achieved with a specific objective lens focal length by moving the scanner objective lens as close as possible to the mirrors, such as to the outlet-side mirror, of the scanner device. The scanner objective lens may, for example, be an F-theta objective lens and the retention devices (the connection elements) may be constructed as inserts (e.g., threaded inserts) that can be inserted or screwed into an outlet opening of the carrier. In order to adapt to the respective scanner objective lens, these inserts further have diameters that are adapted to the scanner objective lens for the passage of the respective laser beam.

In another aspect, the subject matter of the disclosure encompasses a set that includes multiple motor-mirror units for a scanner device, in which the motor-mirror units each have a mirror together with a drive motor and different assembly flanges each having identical abutment faces. The individual motor-mirror units can differ from each other with respect to the mirror size and/or mirror position.

In another aspect, the subject matter of the disclosure can be embodied in a method or methods of configuring a scanner device for 2-dimensional deflection of a laser beam, in which the method or methods include providing a carrier, and selecting, from a group of at least two motor-mirror units, a first motor-mirror unit the includes a first mirror and a first drive motor. Each motor-mirror unit in the group of at least two motor-mirror units includes a first assembly flange, an identical abutment face, and can be releasably secured with the abutment face to a first assembly face of the carrier. Each motor-mirror unit in the group differs from one another with respect to the first mirror size and with respect to the first mirror position relative to the carrier when the motor-mirror unit is secured to first assembly face. The selected motor-mirror carrier then is releasably secured to the first assembly face of the carrier.

Implementations of the method or methods can include one or more of the following features. For example, in some implementations, the method or methods include releasably securing a second motor-mirror unit to the carrier, in which the second motor-mirror unit includes a second mirror and a second drive motor, a second assembly flange that is releasably secured with an abutment face to a second assembly face of the carrier. The second motor-mirror unit can be selected from a group of at least two second motor-mirror units, in which each second motor-mirror unit in the group includes a corresponding assembly flange, identical abutment faces, and can be releasably secured to the same second assembly face of the carrier. Each second motor-mirror unit in the second group differs from one another with respect to the second mirror size and/or the second mirror position relative to the carrier when the second motor-mirror unit is secured to the carrier.

In some implementations, the method or methods can include selecting a retention device from at least two or more retention devices and retaining an objective lens to the carrier with the selected retention device, in which each of the at least two or more retention devices, when used to retain an objective lens in the carrier, retains the objective lens at a different spacing with respect to a mirror of the scanner device.

Other advantages and advantageous configurations of the subject-matter of the invention will be appreciated from the description, the claims and the drawings. The features mentioned above and those set out below may also be used individually per se or together in any combination. The implementations shown and described are not intended to be understood to be a conclusive listing but are instead of exemplary character for describing the invention. The Figures of the drawings are not intended to be understood to be drawn to scale.

BRIEF DESCRIPTION OF THE DRAWINGS

FIG. 1A and FIG. 1B show a scanner device through which a laser beam with a small beam diameter (FIG. 1A) or a laser beam with a larger beam diameter (FIG. 1B) is selectively deflected.

FIG. 2A and FIG. 2B are bottom views of the scanner device of FIG. 1A and FIG. 1B.

FIG. 6A and FIG. 6B show the scanner device of FIG. 1A and FIG. 1B, in which an inlet opening of the carrier is covered by different perforated plates.

FIG. 7A and FIG. 7B show two different thread inserts that are secured to the carrier of the scanner device, different scanner objective lenses being screwed to the threaded inserts for different beam diameters, respectively.

DETAILED DESCRIPTION

Figure 3A:
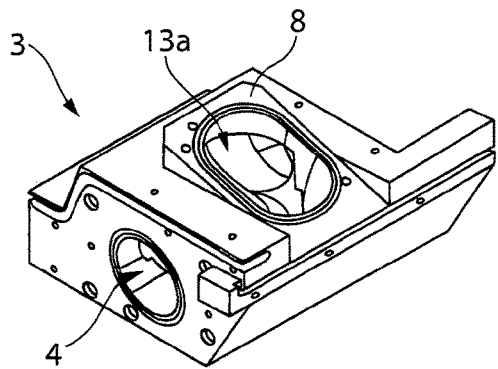
FIG. 3A and FIG. 3B are two different perspective views of a carrier of the scanner device from FIG. 1A and FIG. 2B.

FIG. 1A and FIG. 1B show a scanner device 1 for two-dimensional deflection of laser beams 2a, 2b with different diameters. The laser beam 2a, 2b (the laser beam with a small beam diameter 2a in FIG. 1A and the laser beam with a large beam diameter 2b in FIG. 1B) is introduced into the scanner device 1 via an inlet opening 4 that is formed in a carrier 3 of the scanner device 1 and, after the deflection operation is complete, is discharged again therefrom. The deflection of the different laser beam 2a, 2b is carried out by two mirrors that are concealed in FIG. 1A and FIG. 1B and that are arranged in an inner space of the carrier 3 and each pivotably supported about an axis and driven in a motorized manner.

A mirror at the inlet side forms, together with an inlet-side drive motor 5a, 5b and an inlet-side assembly flange 6a, 6b a first motor-mirror unit 7a, 7b, in which the first motor-mirror units 7a, 7b are secured to the carrier 3. In FIG. 1A, the first motor-mirror unit 7a has the small (first) drive motor 5a and the thin (first) assembly flange 6a for manipulating the laser beam with a small beam diameter 2a. In FIG. 1B, the first motor-mirror unit 7b has the larger (second) drive motor 5b and the thicker (second) assembly flange 6b for deflecting the laser beam with a larger beam diameter 2b. Both the mirrors (not illustrated in FIG. 1A and FIG. 1B) and the (first and second) drive motors 5a, 5b therefore differ from FIG. 1A to FIG. 1B with respect to the size thereof and the spatial position and arrangement thereof.

The assembly flanges 6a, 6b are not only different in terms of their size (for example, one assembly flange 6a is thinner than the other assembly flange 6b), but recesses that are formed in the assembly flanges for releasably securing the drive motors 5a, 5b may also be, for example, constructed to have different depths, different widths, among other features. However, the assembly flanges 6a, 6b have in common that, as a result of their identical outer contour, they are secured to the same first assembly face 8 of the carrier 3 in the same position.

FIG. 1A and FIG. 1B represent different installation situations of one and the same scanner device 1, the first installation situation (FIG. 1A) being adapted to the deflection of the thin laser beam 2a and the second installation situation (FIG. 1B) being adapted to the deflection of the laser beam with a large beam diameter 2b. To deflect the different laser beams 2a, 2b, the corresponding motor-mirror units 7a, 7b are selectively secured to the carrier 3. Due to the different first motor-mirror units 7a, 7b (e.g., due to the different assembly flanges 6a, 6b), it is possible to take into account the different beam paths (that is to say, a beam displacement or a changed beam geometry) that are produced with the deflection of the laser beams with beam diameters 2a, 2b of different sizes. The housing 9 of the scanner device 1 is illustrated in FIG. 1A and FIG. 1B so as to be open. However, the scanner device 1 is closed during laser operation by housing portions not shown in the figures.

FIG. 2A and FIG. 2B are a bottom view of the scanner device 1 for the laser beam having a small and large beam diameter 2a, 2b, respectively, so that an outlet opening 10 that is formed in the carrier 3 for the laser beams 2a, 2b can be seen. A comparison of FIG. 2A and FIG. 2B show a beam displacement V of the incident laser beam that has a large beam diameter 2b in comparison with the incident laser beam that has a small beam diameter 2a. Through the outlet opening 10, it is possible to see the inlet-side first mirror 11a, 11b and an outlet-side second mirror 12a, 12b that cooperate accordingly when the laser beam with a small or large beam diameter 2a, 2b is deflected. In accordance with the larger beam diameter, the first mirror 11b is larger than the first mirror 11a and the second mirror 12b is larger than the second mirror 12a. The laser beams 2a, 2b are discharged in FIG. 2A and FIG. 2B centrally from the outlet opening 10, but are typically pivoted in extremely different directions during operation of the scanner device 1. To this end, the outlet opening diameter is constructed so as to be sufficiently large.

Figure 3B:
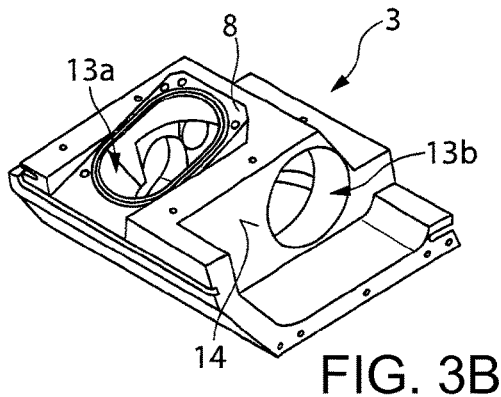
Figure 4A:
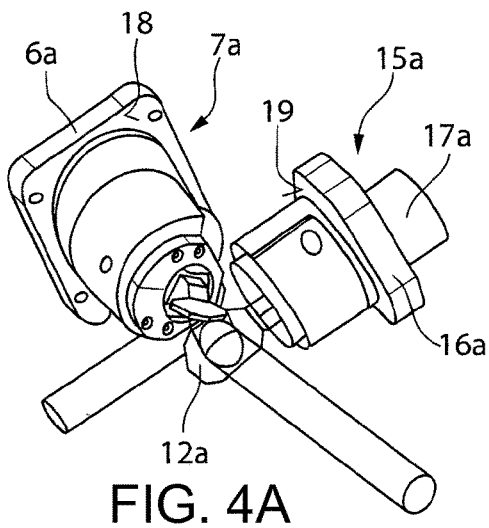
FIG. 4A and FIG. 4B show first and second motor-mirror units for the scanner device from FIG. 1A and FIG. 1B, in which the first and second motor-mirror units have different drive motors, mirrors and assembly flanges in order to deflect the different laser beams.
Figure 4B:
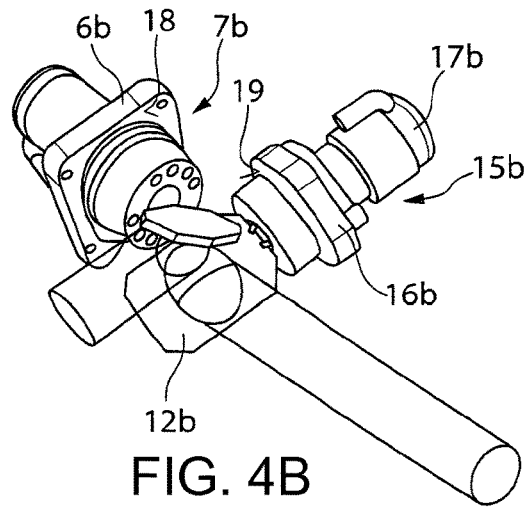

FIG. 3A and FIG. 3B show the carrier 3 of the scanner device 1 in two different perspective views. A first and a second receiving opening 13a, 13b are formed on the carrier 3 for at least partially engaging the first motor-mirror unit 7a, 7b and second motor-mirror unit. In this instance, the contour path of the first receiving opening 13a is adapted to the different mirror sizes and/or different mirror positions of the two motor-mirror units 7a, 7b, which can be selectively arranged therein. It is thereby possible, for example, for a displacement of the mirrors together with the drive motors 5a, 5b to be brought about from the position illustrated in FIG. 1A to the position illustrated in FIG. 1B. In the region of the first receiving opening 13a, there is further formed the first assembly face 8 of the carrier 3 and, in the region of the second receiving opening 13b, a second assembly face 14 of the carrier 3. The first motor-mirror units 7a, 7b can selectively be releasably secured to the first assembly face 8. In the carrier 3, there is further formed the inlet opening 4 for the laser beams 2a, 2b. The opening cross-section is also adapted to the different beam diameters and/or the different mirror sizes and/or different mirror positions of the motor-mirror units 7a, 7b, which can be selectively arranged. The opening cross-section of the inlet opening 4 is adapted to the required inlet-side displacement V (see FIG. 2A and FIG. 2B and the perspective views of FIG. 1A and FIG. 1B). The inlet opening 4 and the first receiving opening 13a are constructed as elongate holes.

FIG. 2A and FIG. 2B show the inlet-side first motor-mirror units 7a, 7b and outlet-side second motor-mirror units 15a, 15b for deflecting the laser beam having a small or large beam diameter 2a, 2b, respectively. The outlet-side second mirrors 12a, 12b each form, together with outlet-side assembly flanges 16a, 16b and corresponding outlet-side drive motors 17a, 17b, the second motor-mirror units 15a, 15b. The second motor-mirror units 15a, 15b can be selectively secured to the second assembly face 14 shown in FIG. 3B. The assembly flanges 6a, 6b of the first motor-mirror units 7a, 7b each have identical abutment faces 18 and can be releasably secured with the abutment faces 18 to the first assembly face 8 illustrated in FIG. 3A and FIG. 3B. Accordingly, the assembly flanges 16a, 16b of the second motor-mirror units 15a, 15b also each have identical abutment faces 19 for securing to the second assembly face 14 of the carrier 3.

Figure 5A:
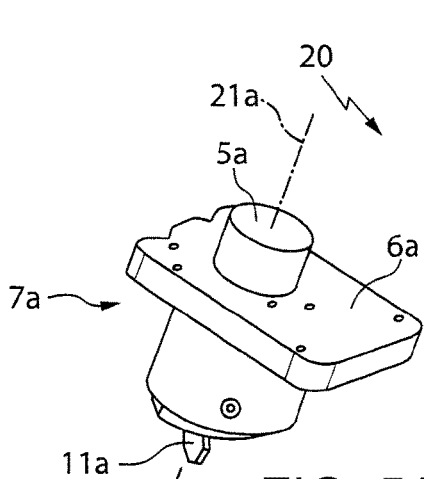
FIG. 5A and FIG. 5B show a set of first motor-mirror units.
Figure 5B:
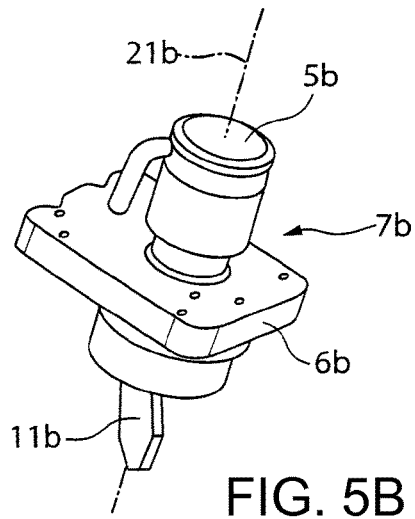

FIG. 5A and FIG. 5B show a set 20 of a plurality of (in this instance two) inlet-side first motor-mirror units 7a, 7b from which another motor-mirror unit 7a, 7b is selected for securing to the carrier in accordance with the beam diameter. The one first mirror/motor unit 7a has the one small first mirror 11a and the thin (first) assembly flange 6a with a small (first) drive motor 5a that is arranged in a first position. The other first motor-mirror unit 7b has the large first mirror 11b and the thicker (second) assembly flange 6b with a larger (second) drive motor 5b that is arranged in another position. The two motor-mirror units 7a, 7b consequently differ from each other with respect to the mirror size and/or mirror position. The individual first mirrors 11a, 11b are each pivotably supported about axes 21a, 21b and driven in a motorized manner.

FIG. 6A and FIG. 6B show the scanner device 1 in which the inlet opening 4 of the carrier 3 is at least partially covered by different perforated plates 22a, 22b. The hole openings 23a, 23b through which the laser beams 2a, 2b with different beam diameters are introduced differ both in terms of diameter and in terms of their position relative to the perforated plates 22a, 22b. The laser beams 2a, 2b that are introduced pass from an outer region of the scanner device first through the corresponding hole openings 23a, 23b and then through the inlet opening 4 into the inward of the carrier 3 or into the inward of the housing 9 of the scanner device 1. In FIG. 6A and FIG. 6B, the carrier 3 partially forms the housing 9 of the scanner device 1 or the carrier 3 is part of the housing 9.

FIG. 7A and FIG. 7B show different retention devices that are constructed as threaded inserts 24a, 24b and by which different scanner objective lenses 25a, 25b (for example, F/theta objective lenses) or the outlet-side optical lenses thereof can be positioned with different spacing with respect to the carrier 3 (e.g., with respect to the mirrors 11, 12 of the scanner device 1). In FIG. 7A and FIG. 7B, the carrier 3 is illustrated only partially. The threaded insert 24a for the small scanner objective lens 25a or for the laser beam with a small beam diameter 2a has a small inner thread 26a or a small inner diameter, whereas the threaded insert 24b for the larger scanner objective lens 25b or for the laser beam with a large beam diameter 2b has a large inner thread 26b or a large inner diameter. However, both threaded inserts 25a, 25b have for securing to the carrier 3 or to the outlet opening 10 of the carrier 3 an outer thread 27 of the same size.

A number of implementations have been described. Nevertheless, it will be understood that various modifications may be made without departing from the spirit and scope of the invention. Accordingly, other implementations are within the scope of the following claims.

What is claimed is:

1. A scanner device set for 2-dimensional deflection of a laser beam by two mirrors pivotably supported about an axis, comprising:

a plurality of first motor-mirror units, each first motor-mirror unit of the plurality of first motor-mirror units including a respective first mirror together with a first drive motor and each first mirror of each first motor-mirror unit being pivotably supported about a corresponding mirror axis; and a carrier for securing to any one of the first motor-mirror units of the plurality of first motor-mirror units, the carrier comprising an inlet opening, wherein each first motor-mirror unit of the plurality of first motor-mirror units includes a respective first assembly flange comprising an identical first abutment face, and is configured to be releasably secured with the first abutment face to a first assembly face of the carrier, wherein for a first one of the first motor-mirror units, the first assembly flange has a first thickness, and for a second one of the first motor-mirror units, the first assembly flange has a second thickness that is different than the first thickness, and each first motor-mirror unit of the plurality of first motor-mirror units differs from one another with respect to the first mirror size and/or first mirror position relative to the carrier when the first motor-mirror unit is secured to the carrier, and differs from one another with respect to the spatial position of its mirror axis relative to the first assembly flange of the first motor-mirror unit.

2. The scanner device set according to claim 1, further comprising a plurality of second motor-mirror units, each second motor-mirror unit of the plurality of second motor-mirror units comprising a respective second mirror, a respective second drive motor, and a respective second assembly flange that can be releasably secured with a second abutment face to a second assembly face of the carrier.

3. The scanner device set according to claim 2, wherein each second motor-mirror unit of the plurality of second motor-mirror units includes identical second abutment faces, and can be releasably secured to the second assembly face of the carrier, and wherein each second motor-mirror unit of the plurality of second motor-mirror units differs from one another with respect to the second mirror size and/or a position of the second mirror when the second motor-mirror unit is secured to the carrier.

4. The scanner device set according to claim 1, wherein the carrier comprises:
a wall; and
a receiving opening for at least partially engaging any one of the first motor-mirror units of the plurality of first motor-mirror units in the carrier.

5. The scanner device set according to claim 4, wherein a contour path of the receiving opening is adapted to the different mirror sizes and/or different mirror positions of the plurality of first motor-mirror units.

6. The scanner device set according to claim 1, wherein a cross-section of the inlet opening is adapted to the different mirror sizes and/or different mirror positions of the plurality of first motor-mirror units.

7. The scanner device set according to claim 4, wherein the receiving opening is an elongate hole.

8. The scanner device set according to claim 6, wherein the inlet opening is an elongate hole.

9. The scanner device set according to claim 1, the carrier further comprising a plurality of different perforated plates, wherein each perforated plate comprises a different diameter hole opening.

10. The scanner device set according to claim 1, wherein the carrier is arranged to form at least partially a housing of the scanner device.

11. The scanner device set according to claim 1, wherein, the first assembly flange of the first thickness comprises a recess of a first size for releasably securing to the first drive motor of the first one of the first motor mirror units, and, the first assembly flange of the second thickness comprises a recess of a second size, for releasably securing to the first drive motor of the second one of the first motor mirror units.

12. The scanner device according to claim 1, wherein for the first one of the first rotor-mirror units, the first drive motor has a first motor size, and for the second one of the first motor-mirror units, the first drive motor has a second motor size that is different than the first motor size.

* * * * *